Dec. 20, 1949  B. MARTIN  2,492,052
DECORATING MACHINE
Filed Dec. 1, 1944  6 Sheets-Sheet 1

Fig. 1

INVENTOR.
Bradford Martin
BY
Wood, Arey, Herron & Evans
Attorneys.

Dec. 20, 1949      B. MARTIN      2,492,052
DECORATING MACHINE
Filed Dec. 1, 1944      6 Sheets-Sheet 2

INVENTOR.
Bradford Martin
BY
Wood, Arey, Herron & Evans
Attorneys

INVENTOR.
Bradford Martin
BY Wood, Arey, Herron & Evans
Attorneys.

Dec. 20, 1949  B. MARTIN  2,492,052
DECORATING MACHINE
Filed Dec. 1, 1944  6 Sheets-Sheet 4

INVENTOR.
Bradford Martin
BY
Wood, Arey, Herron & Evans
Attorneys.

Dec. 20, 1949     B. MARTIN     2,492,052
DECORATING MACHINE
Filed Dec. 1, 1944     6 Sheets-Sheet 5

INVENTOR.
Bradford Martin
BY
Wood, Arey, Herron & Evans
Attorneys.

Patented Dec. 20, 1949

2,492,052

UNITED STATES PATENT OFFICE 2,492,052

DECORATING MACHINE

Bradford Martin, Washington, Pa., assignor, by mesne assignments, to Solar Engineering & Equipment Co., Beaver, Pa., a corporation of Pennsylvania Application December 1, 1944, Serial No. 566,157

7 Claims. (Cl. 101—124)

This invention relates to a machine for marking and decorating containers with figures or designs of paint or pigment. It relates particularly to a machine for stencilling upon bottles, tumblers, jars and other articles, upon which the decorating or marking composition is impressed through a stencil screen by means of a squeegee.

The stencil screens adapted to be used in this mode of decoration are relatively fragile gauze-like membranes, made impervious in the non-design areas and stretched tightly over a frame from which they are supported. The squeegee is passed over the taut membrane, pushing the coloring or marking composition just ahead of it and thereby propelling the color through the openings in the screen upon the surface of the ware. The decorating process is one which lends itself particularly well to high production methods. In the course of a day the screen may be passed over the membrane many hundreds of times, at least once for each article being marked.

By virtue of the pressure which the squeegee exerts upon the stretched stencil membrane the wear it is subjected to is considerable especially if the pigment composition is of an abrasive ceramic nature adapted subsequently to be fused onto the surface of the ceramic or vitreous articles as is conventional in the glass, pottery and vitreous enamelling arts. This wear in and of itself can be accommodated without undue replacements of the stencil screens if and when the screen itself is supported at its underneath side by the ware to which the color is being applied. However, in high production stencilling machines the provision is requisite that the squeegee be applied to the stencil automatically at the desired pressure while the stencil, in turn, is advanced to bring successive portions of its design areas beneath the squeegee. In these machines, whether fed automatically or by hand repetitively, it frequently occurs that no ware is disposed beneath the stencil during the machine operation; the operator may fail to load the machine through one cycle of its operation or the ware may not be disposed properly in the chuck adapted to support it during stencilling. When such conditions occur the squeegee presses downwardly upon the unsupported stencil and it must bear the full pressure load. What usually happens in such an instance is that the screen either becomes so badly stretched, crimped, dented or bent that it is no longer usable, or else the squeegee actually tears the stencil from its frame. Even metal screens, made of copper or steel, are easily damaged in this manner.

A principal objective of this invention has been to provide an automatic stencilling machine having the squeegee operable cyclically into pressure engagement with the screen, in conjunction with a safety cut-out mechanism that prevents engagement of the squeegee with the screen when no ware is in position simultaneously to support the screen from the opposite side thereof. This apparatus functions to prolong the life of the screen many times beyond what the life would be were no such provision utilized. For instance, the experience to date with a machine of this character indicates that the safety apparatus is effective to increase the life of the screen in three to five times what it otherwise would be. Inasmuch as the screens are expensive the actual saving in cost over a short period of time is appreciable, even neglecting the cost of shutdowns for screen replacement.

It is a further objective of this invention to provide a machine in which stenciling takes place first in one direction of screen movement and then in an opposite direction of screen movement, whereby lost or waste motion attending the return of the screen to its starting position is obviated. Moreover, when the relative movement of the screen with respect to the stencil always is in one direction there is a cumulative stretching and bending of the steel of the screen caused by the drag of the squeegee upon it. After repeated cycles of operation this stretching becomes manifest as a warping or distortion of the design. Where registry is required, as in two-color decoration, the distortion causes overlapping and poor appearance.

A still further objective of this invention has been to provide an automatic or continuously running machine in which the starting and the stopping positions of the screen accurately and reliably may be controlled micrometrically, through fine, screw thread adjustment, in order that accurate registration of the successive stencil designs is obtained as is requisite in multi-color stencilling. In single color decorating operations this feature is of no considerable importance but it is a primary consideration where two colors are to be applied in registry one after another. The invention contemplates a structure in which stencilling is conducted in both directions of screen movement and the exact point at which the application of the design commences in each direction of stenciling movement may be set to and maintained at a given position. In more detail, the invention contemplates a drive mechanism for shifting the screen back and forth, means for adjusting the positions of the screen with respect to the shifting movement in one direction of operation and a positive stop for limiting the movement of the screen in an opposite direction of its operation whereby the relative starting position at which stencilling is commenced is controlled in either direction. In conjuncton with this mechanism an apparatus is employed which enables the total range of screen movement to be adjusted for accurate accommodation of designs of different total length.

A still further objective of the invention has been to provide an apparatus embodying a chuck or ware holder operated automatically in unison with a stencil screen and squeegee in which the mechanical movements incidental to these three coincidental operations are effected from a common gear box drive and at variable speed. In the preferred embodiment cams individual to the three movements are disposed upon the gear box shaft through an arrangement which enables the parts to be disposed compactly. These cams are individually adjustable so that their various phases of operation may be set according to a timing cycle and two of the cams, one for chuck opening and closing and one for the squeegee and chuck lift, are arranged adjacent one another at one side of the gear box while the drive for the stencil is disposed at the other side of the gear box to equalize the load upon its journals.

From a mechanical point of view, which comprehends a structure having simple, easily constructed and easily repaired parts, the invention provides apparatus in which the stencil is movable in back and forth directions while the squeegee is advanced toward the stencil from one side simultaneously as the ware or chuck for holding the ware is advanced toward the stencil from the other side at the commencement of a stencilling operation. The stencil may move in a linear path or in an arcuate path as required by the nature or conicality of the articles being decorated. In either event the chuck is disposed in an accessible position at which it may be fed by hand or by an automatic loader. The loader forms no part of this invention and therefore is not disclosed, though automatic loaders suitable for use in conjunction with the present machines are known and available.

From these foregoing principles upon which this invention is based and from the following detailed description of the drawings in which a preferred embodiment of the invention is disclosed, those skilled in the art will comprehend the various modifications to which the apparatus is susceptible.

Figure 3:
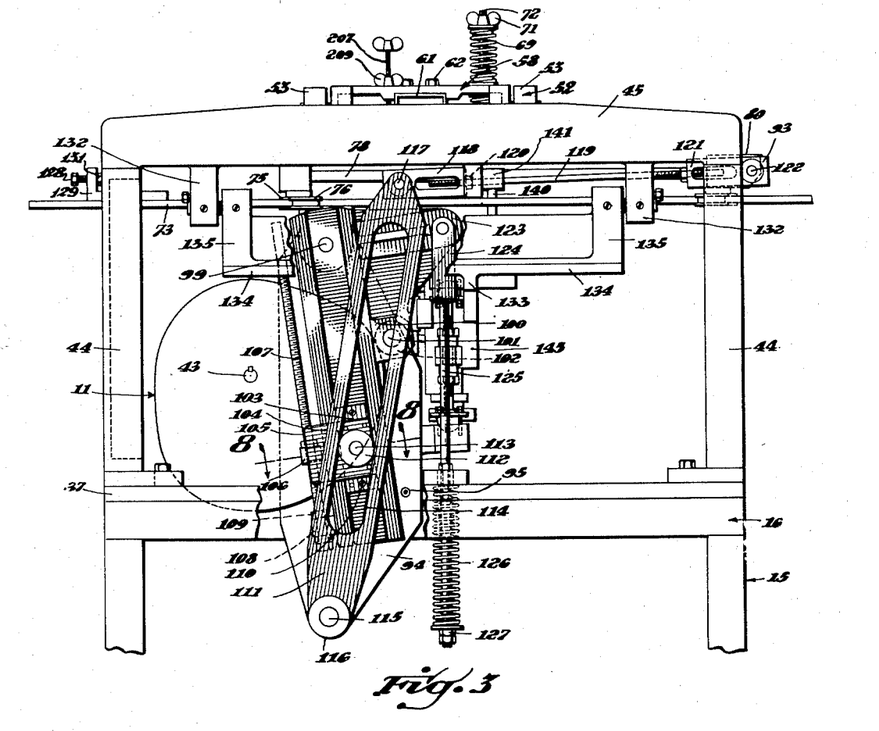
Figure 3 is a rear elevation.
Figure 12:
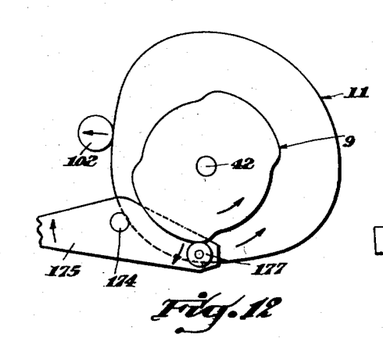
Figures 12 and 13 are diagrammatic views showing the operation of the cams for respectively driving the screen, operating the chuck, and moving the ware and squeegee toward and from the screen.
Figure 13:
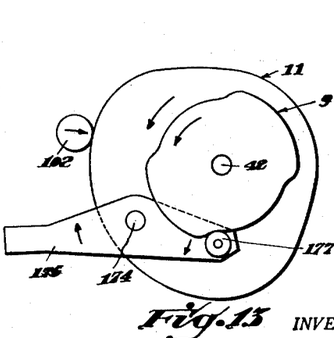
Figure 14:
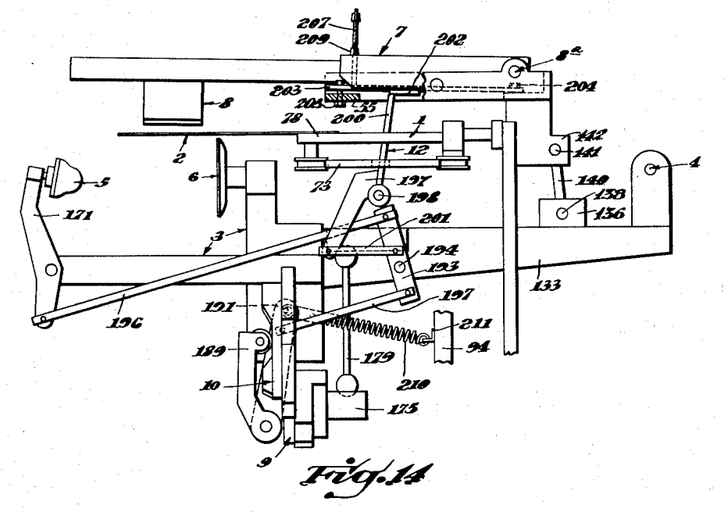
Figures 14 and 15 are diagrammatic views illustrating the operation of the chuck and squeegee toward and from the screen and control of the squeegee movement in accordance with chuck opening and closing.
Figure 15:
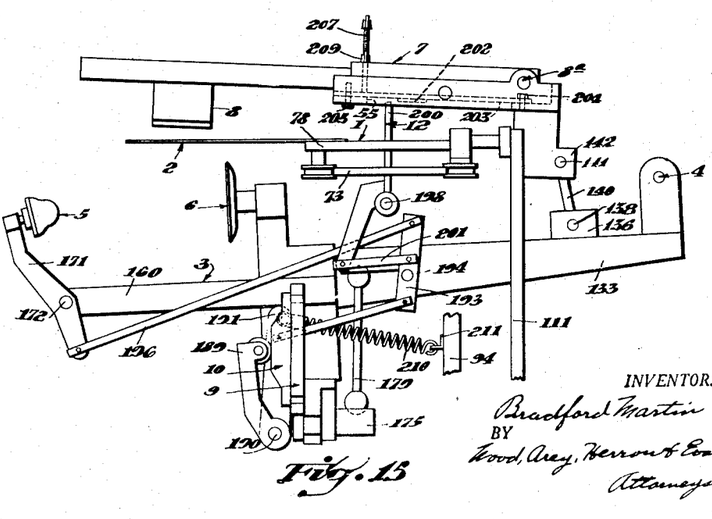

While the details of construction of the machine are described fully hereafter, it is helpful to refer briefly to the diagrammatic views, Figures 14 and 15, which illustrate the principal parts of the preferred structure. These are the screen carrier 1 which has the stencil screen 2 extending outwardly therefrom. A chuck assembly, indicated generally at 3, is positioned at one side of the screen and moves up and down about the pivot 4. The chuck per se, in the form disclosed in Figures 1–15, comprises mating elements 5 and 6 between which the ware is held. At the other side of the screen is the squeegee assembly 7. This bears the squeegee 8 upon the screen to force pigment therethrough onto the surface of ware held in the chuck. The squeegee assembly is pivotally mounted at 8a, but this pivot in turn is carried in a bracket which is rockable in unison with the chuck assembly 3. There are three drive cams indicated generally at 9, 10 and 11 (the latter is not shown in Figures 14 and 15 but appears in Figures 3, 12 and 13). Cam 9 controls the movement of the chuck assembly 3 upwardly and downwardly and this, in turn, through linkage interconnection with the squeegee assembly 7, also controls the movement of the squeegee 8 toward and from the screen. Cam 10 opens and closes the chuck, while the interconnection indicated generally at 12 operated in accordance with the chuck prevents the squeegee from engaging the screen unless the chuck is loaded. Cam 11 drives the screen in back and forth directions. These parts cooperate with one another as described in the balance of the specification.

*Detailed construction*

The apparatus is mounted upon a pedestal or base 15 (Figures 1 and 2) made up of corner posts suitably fastened at their upper ends to a flat frame 16. The lower portions of the legs are braced by rails 17 at the front and back of the machine and also by upper cross rails 18 at the sides. Angles 19 span the front and rear rails 17 and furnish the foundation for a base 20 of a motor driven variable speed unit. The motor 21 has a base block which is slidable back and forth upon the base 20, the movement between the two being effected through a rotatable screw 22. Through a belt 23, which engages the motor pulley 24, the motor drives a pulley 25 mounted on a jack shaft 26 rotatably supported in pillow boxes 27 which are fastened to the sidewise rails 18 of the frame. The motor drive is of the Reeves type comprising cones facing one another which, through their spacing, govern the effective diameter at which they are engaged by the belt 23.

A control shaft 28 is journalled in the top frame 16 of the base and is held against displacement by the collars 29 which engage the inward faces of the top frame members. Shaft 28 extends beyond the frame at the front end of the machine to carry a control wheel 30 and, within the frame, shaft 28 carries the sprocket 31 around which a chain 32 extends into engagement with a sprocket 33 mounted on the screw shaft 22 of the motor base. The rotation of the control wheel 30 drives the shaft 22, and the threads thereof move the motor forward or backward, thereby effecting a variation in the speed at which the jack shaft 26 is driven.

The motor 21 is controlled by a switch 34 comprising start, stop and jog positions, this switch being interconnected through the conduit 35 with a main control switch 36 that is mounted at the side of the machine.

A table 37 is placed upon the top of the frame at the front portion thereof, and a speed reducer unit, 38, is mounted on the plate above the frame and to one side thereof. The reducer unit is driven through a belt 39 which interconnects a pulley 40 mounted upon the jack shaft 25 with a pulley 41 mounted upon the input shaft of the reducer unit. The speed reducer box has output shafts 42 and 43 extending respectively from each end thereof in alignment, and cams 9 and 10 are mounted adjacent one another on one output shaft 42 while the screen drive cam 12 is mounted on the other 43 at the opposite or rearward side of the speed box. In this manner the load upon the speed reducer journals is balanced to preserve the assembly from excessive wear.

Brackets 44, appropriately ribbed for strength, extend upwardly from the table 37 at each side of the machine, the brackets having inturned feet at their lower edges through which the brackets are bolted to the table. These side brackets are cross-connected at the top through a head piece 45 which is fastened thereto by means of bolts 46. The head piece 45 consists principally of a ribbed plate which is mounted toward the back side of the machine and it has arm portions 47 extending forwardly therefrom to provide supports for the pivots on which the entire squeegee assembly 7 is sustained. To rigidify the arms, they are braced by the gussets 48.

Squeegee assembly

The arms 47 of the headpiece 45 are spaced apart from one another and each at its forward end has a pointed pivot member 49 extending inwardly therefrom, the pivots being held against outward movement by engagement with the heads of screws 50 which are threaded into the arms at points adjacent the pivot heads. Set screws 51 also pass through the arms to bear upon the pivots for locking purposes, while the screws 50 provide take-up for pivot adjustment. The general construction is the same as that shown in Figure 10.

Pivots 49 support a rectangular frame 52 between them, comprising side arms 53 cross-connected rearwardly as at 54 by an angle portion which has a part thereof extending along the bottom of the frame to provide a shelf, and also cross-connected at their front end as at 55. The pivots 49 bear upon the side arms at their mid portions approximately, the point ends of the pivots engaging conical apertures in cooperating pivot pieces 56 mounted in suitable bores in the side arms. Set screws 57 lock the pivot members 56 in place.

Figures 2, 10, 11:
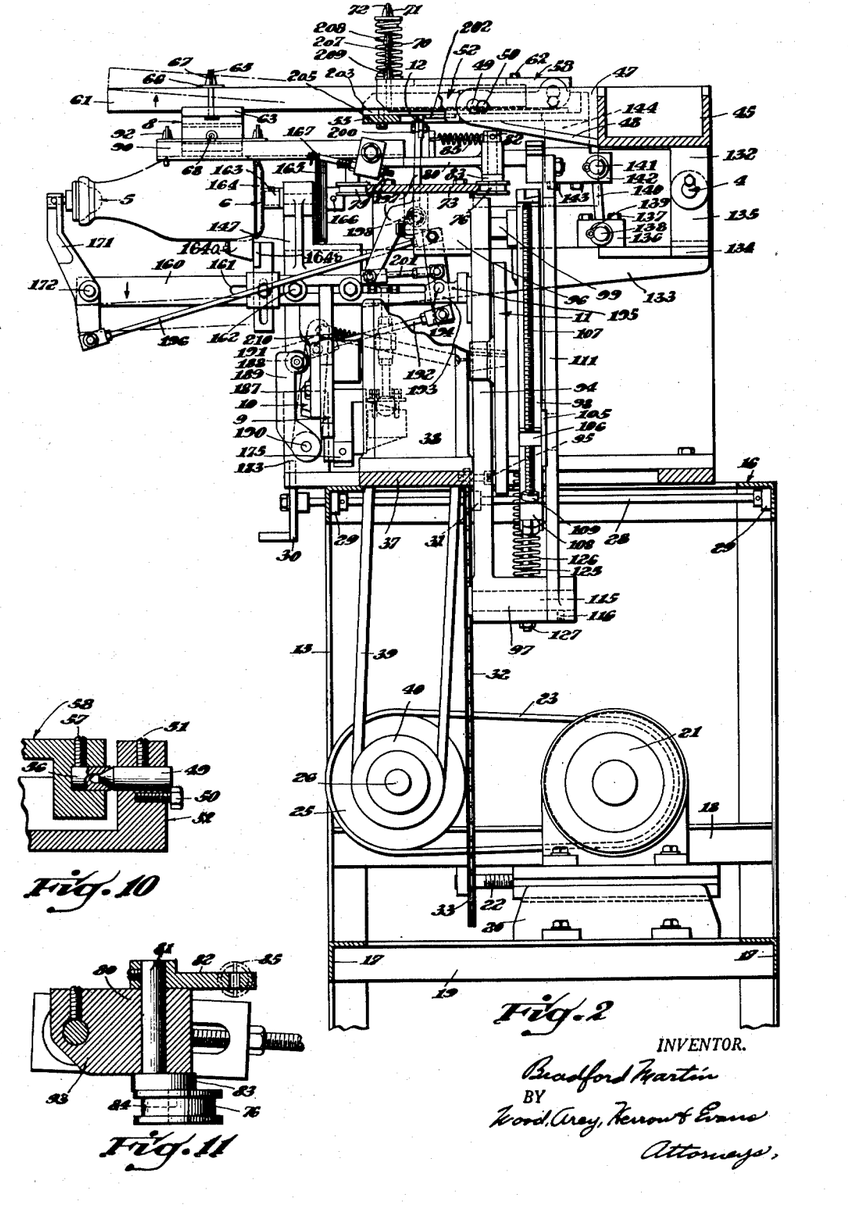
Figure 2 is a side elevation thereof.
Figure 10 is a sectional view taken on the line 10—10 of Figure 4 showing details of construction of a pivot bearing for the squeegee support assembly.
Figure 11 is a cross sectional view taken on the line 11—11 of Figure 4 showing details of construction of an eccentric mounted guide roller for supporting the screen carrier.

A second frame, 58, is pivotally sustained, at 8a, within the side arms 53 of the first frame 52 at the rearward portion thereof adjacent the cross piece 54. Inasmuch as the details of construction of the pivot 8a are the same as those just described, and are the same as shown in Figure 10, the details are not repeated. Frame 58, is movable about the axis of its pivots 8a independently of the pivotal movement of the frame 52 about its pivotal axis. The central portion of the inner frame 58 is open as at 60.

A squeegee arm 61 in the form of a channel member extends forwardly from the frame 58, being fastened to the underneath side thereof through bolts 62. The arm 61 is of substantial width to provide support for the squeegee carrier 63. This carrier has a groove in its upper face providing marginal flanges 64 which guide the carrier along the arm during adjustment in the position thereof, and bolts 65 extend upwardly from the marginal flanges and through a cross strap 66 beyond which the bolts carry thumb nuts 67 for locking the carrier in place upon the arm. The lower face of the carrier 63 is grooved to receive the squeegee 8 which is held therein against displacement by a pin 68. The squeegee has somewhat of a floating movement in its holder in order that it may accommodate itself to local variations in the contour of the ware as reflected by distortion of the screen upon which it bears.

The inner frame 58 is yieldably mounted within the outer frame 52 by means of compression springs 69 and 70 (Figure 1) spring 69 being interposed between the frames so as to tend to spread them apart, while spring 70 is placed upon the top of the inner frame and is held under balanced compression by a washer under a thumb nut 71 carried by a screw 72 which extends upwardly from the inner frame and through the outer frame and through both springs. This arangement offsets the weight of the arm 61 and squeegee carrier.

Screen assembly

Figure 1:
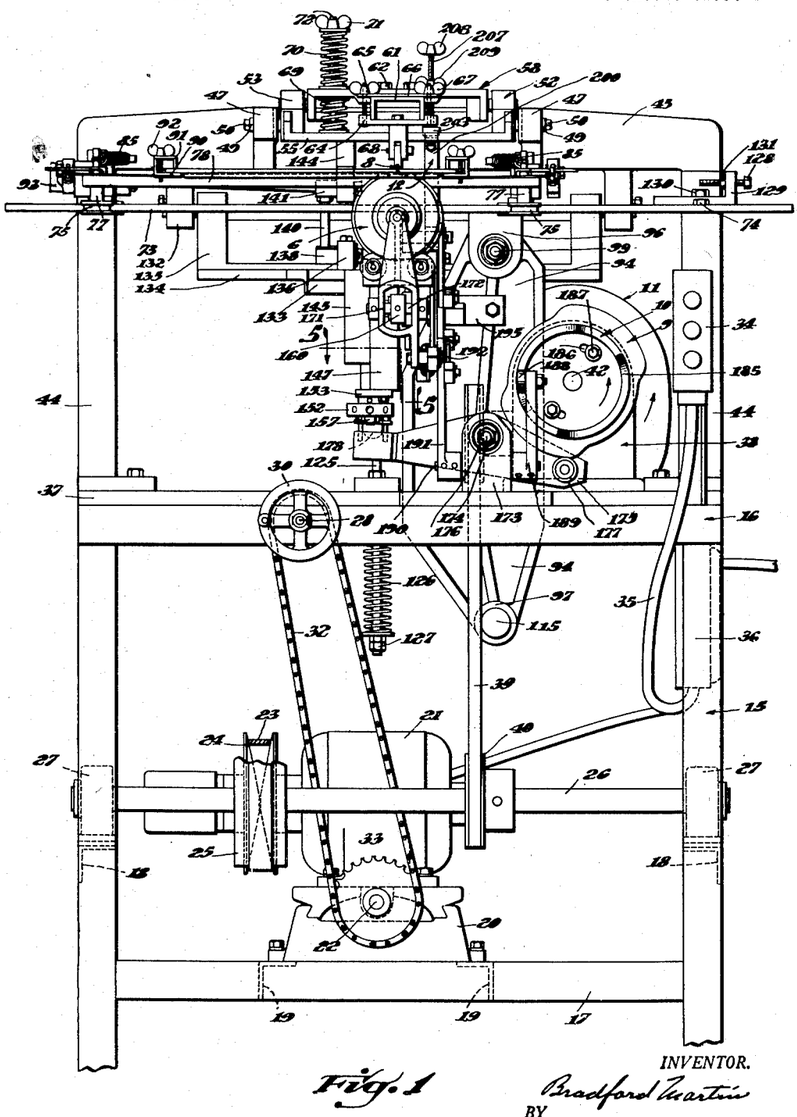
Figure 1 is a front elevation of the apparatus.

The upper forward portions of the side plates 44 are lower than the points at which the head plate 45 is mounted and a guide plate 73 is mounted across the side brackets 44 at a point rearwardly of the squeegee 8. This plate is held in place by bolts 74 and its sidewise edges furnish guides for the pairs of rollers 75—75 and 76—76, the latter being eccentrically mounted as shown in Figure 11. The front rollers 75 are rotatably journalled upon studs 77 extending downwardly from a screen adjustment plate 78 which is located above the guide plate 73. The roller support studs are headed at their lower ends to sustain the rollers while the upper ends of the studs pass through the plate 78 to carry nuts 79 at the top surface thereof. The rollers are grooved, as shown in Figure 1, so that the flanges at the opposite sides of the rollers bear against the upper and lower surfaces of the plate 73 along the front edge thereof.

At each end of the adjustment plate 78, which is shorter in length than the guide 73, to accommodate longitudinal guided movement of the former, an arm 80 extends backwardly therefrom over the plate 73 to carry a stud 81. Each stud has a lever 82 at its upper end, while the lower end of each stud, beneath the arm 80, is headed as at 83 (Figure 11) to bear against the lower face of the arm 80. The rear rollers 76 are rotatably mounted upon eccentric studs 84 which extend from the heads 83. Thus the rollers 76 are drawn toward the rear edge of the guide plate 73 by means of tension springs 85 each having one end thereof connected to the lever 82, while its opposite end of each spring is hitched to a post 86 projecting from arm 80. The lever arms 82 are fastened upon the studs 81 by means of set screws 87. Through the spring tension bearing of the rollers 76 against the back edge of the guide plate 73 the forward rollers 75 are also brought into pressure engagement with the front edge of the plate, and the screen plate 75 therefore is guided for smooth back and forth movement. For decoration of conical ware, bottle shoulders and the like, the guide plate may be of arcuate configuration.

Plate 78 has a plurality of rows of spaced bores 88 therein at points adjacent both its ends. Bolts 89 pass through these bores to fasten the screen carrying arms 90 to the plate 78 whereby the screen 2 is sustained between the arms 90. Its position relative to the plate 78, that is relative to the movement of this plate with respect to the squeegee, may be adjusted by locking the arms 90 in different holes of the series, and the arms also may be moved apart or moved closer to one another to accommodate screens of different lengths. The screen element 2 may be of the usual type, suitably stretched over a frame which rests upon the arms 90. In the structure shown the arms are angle irons facing one another and with the flanges extending upwardly, and the screen is secured thereto by means of plates 91 lying over the upper edges of the screen frame, and clamped by means of thumb nuts 92.

One of the arms 80, extending rearwardly from the plate 75 at the left side of the machine (Figure 4), has a portion 93 extending outwardly therefrom at a point adjacent the pivotal mounting of the back roller 76 to provide interconnection of the movable plate 78 with its drive mechanism.

The drive for the screen is furnished from cam 11 which is keyed to the stub shaft 43 at the back side of the speed box 38.

Table 37 has a bracket 94 extending in vertical direction and bolted to the back edge of the table through the cap screws 95. The bracket extends upwardly to a point just underneath the guide plate 73, with which it is connected, the upper portion also terminating in a journal block 96 which projects from the forward face of the bracket. The bracket also drops down below the table 37 into the area of the frame 16 and its lower end terminates in a rearwardly extending journal block 97. The cam 11, as shown in Figure 2, is set off to one side of the brackets and is adjacent to the rear face thereof.

An arm 98 has a stub shaft 99 rotatably journalled in the journal block 96 at the top of the bracket and the arm 98 extends over the face of the cam 11. Intermediate its length the arm has a boss 100 projecting from an edge thereof to provide the support for a pin 101 about which a cam follower 102 is rotatable. This roller engages the cam 11 at the periphery thereof, thereby causing a pivotal rocking movement of the arm 98 upon cam rotation.

The arm 98 has a dovetail slot in its outer face which is engaged by a slide block 103. A plate 104, mounted upon the slide block to lie over the dovetail groove, extends sidewisely therefrom as at 105. This plate carries a nut member 106 adjacent the edge of the arm and the nut is traversed by a screw 107, the screw being rotatably supported in a boss 108 at the lower end of the arm 98. The screw shaft is sustained upon the boss by means of lock bolts 109 at each side of the boss. Rotation of the screw moves the slide block 103 along the dovetail slot and, for locking purposes, the block has some set screws 110 extending therethrough to bear upon the back face of the groove and thereby wedge the slide block against movement.

Figure 8:
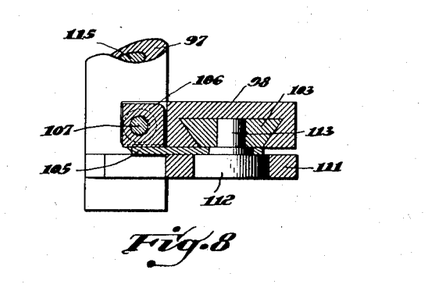
Figure 8 is a cross sectional view on the line 8—8 of Figure 3.

Motion from the slide block 103, as it is moved by the arm 98, is transmitted to a rocker arm 111 through a roller 112 that extends outwardly beyond the nut supporting plate 104. This roller, as shown in Figure 8, is mounted rotatably upon a stud 113 that is fixed in the slide block. The rocker arm 11 has an elongated slot 114 cut longitudinally therein to receive the roller 112 and the lower end of the rocker arm is fixed upon a shaft 115 that projects from the lower bracket journal block 97, with a set screw 116 fastening the rocker arm upon the shaft.

The upper end of the rocker arm is connected through a bolt 117 with a member 118 which forms one end of a reach rod 119. The reach rod is adjustably threaded into the member, and is locked in place against rotation by means of a nut 120. At its opposite end, the reach rod terminates in a member 121 which is similar to the block 118 and which, through pin 122, is in pivotal connection with the screen carriage 78 at the member 93 carried by the left hand arm 80.

For the purpose of biasing the cam follower 102 against the periphery of the cam 11 the slotted arm 98 has a wing 123 extending outwardly therefrom at a point just below the pivotal axis of the arm at shaft 99. A clevis 124 is pivotally mounted on the wing at its outer extremity, and a spring rod 125 extends downwardly from the clevis through suitable passage in the table 37 to a point below the table where it is surrounded by a compression spring 126. The spring has one end bearing on the table and the opposite end rests upon a washer above a pair of lock nuts 127.

This drive structure operates as follows: The spring 126 pulls downwardly upon the arm 123, thereby holding the roller 102 against the cam periphery. The roller, tracking upon the cam, causes oscillation of the arm 98 and thereby swings the roller 112 back and forth. Roller 112, in turn, causes a swinging movement of the rocker arm 111 which, through the reach rod, drives the screen carriage 78. The variability of the position of the roller 112 upon the arm 98 provides adjustment for the length of stroke through which the screen is operated. Reach rod 119, in turn, is adjustable over a substantial range to provide the means for altering the starting and stopping positions of the screen relative to the squeegee 2 for a stroke of given length. Thus the point at which the screen begins to operate, or the position of the screen at one end of its stroke, is governed. One of the features of the structure just described is that the screen is movable through a substantial range from a cam having a relatively short throw.

A positive abutment is employed to govern the point at which the screen is stopped at the other end of its stroke, or the point at which the screen starts to operate when being moved in the return direction. This abutment is a screw threaded member 128 extending longitudinally of the guide plate 73 and carried in an angle bracket 129 which is bolted in place upon the carriage at the right side of the machine by means of a bolt 130. The bracket is slotted to permit major adjustments and screw 128 is threaded into the upstanding portion of the bracket being locked in place, once set, by means of a nut 131. Movement of the screen in one direction is positive, that is, the throw of the cam forces the follower outwardly to provide screen movement. In the return direction, toward the abutment screw 128, the follower engages the cam periphery under the biasing pressure of the spring 126 and the screen may be withheld, for instance by engagement of the screw 128, at any point within its stroke in that direction. When the screen is stopped before the end of the stroke is reached as governed by the cam, the follower is simply held against spring pressure from tracking on the cam periphery.

Chuck assembly

The head plate 45 spanning the side wall brackets 44 has a pair of lugs or pieces 132 extending from its lower face in spaced relationship to one another at the rearward edge of the plate. These bosses pivotally support a chuck arm 133 between them. This arm, illustrated diagrammatically in Figure 3, comprises an elongated member having branches 134—134 extending outwardly therefrom in opposite directions at its rearward extremity, and bosses 135 project upwardly from the branches so that their outer faces lie adjacent the inward faces of the head piece bosses 132. The pivotal connection, 4, between the chuck arm and the bosses is of the type previously described and as shown in Figure 10.

A block 136 which is bolted to the chuck arm as at 137 is bored transversely to receive a stud 138 that has a head at one face thereof and carries a washer and cotter pin 139 at the other side. A link 140 (Figures 1 and 2) extends upwardly from the head of this stud into connection with the head of a similar stud 141 which passes through a block 142. The latter block is fastened by means of bolts 143 to the outer frame 52 at the lower face of a boss 144 that extends downwardly from the back piece 54 of the outer squeegee assembly frame. The studs 138 and 141 are rockable in their bearings and the link thus interconnects the chuck arm 133 with the squeegee assembly 7 for movement of the two in unison.

In the particular machine shown in these drawings, the positions of the pivots 4 and 8a, relative to one another and to the weight of the pivoted assemblies, are such as to bias the chuck arm and the squeegee assembly to open position by gravity; that is, uncontrolled, the weight of the chuck arm is greater than the weight of the squeegee assembly in relation to the pivot positions and, since the chuck arm swings downwardly under its own weight, it lowers the rear part of the outer squeegee frame thereby lifting the front part to disengage the squeegee from the stencil. The chuck arm and squeegee are driven toward the stencil during machine operations by the cam 9.

Figure 5:
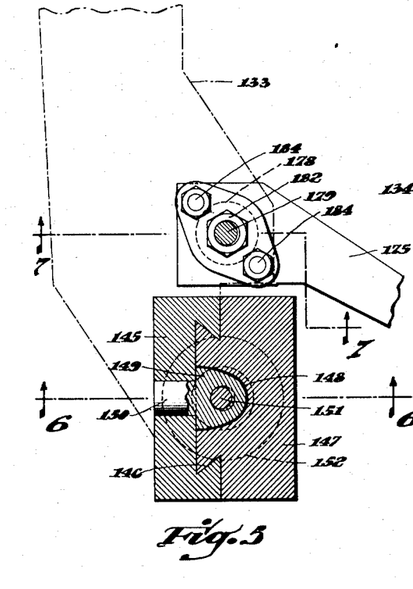
Figure 5 is a cross sectional view taken on the line 5—5 of Figure 1 looking down upon the adjustable chuck mounting.
Figure 6:
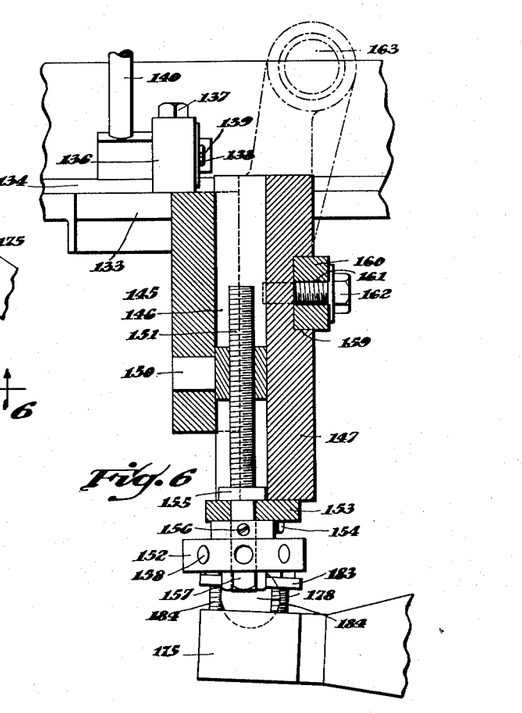
Figure 6 is a sectional view taken on the line 6—6 of Figure 5 showing the adjustable chuck mounting in cross section.

Near the front of the machine, but behind the screen stencil 2, the chuck arm has a vertically extending portion 145 (Figures 1 and 6) in one face of which is a vertically extending dovetail groove 146 which forms a slide for a chuck block 147. Intermediate the dovetails on the block 147 the inner face of this block has a groove 148 (Figure 5) which clears a nut 149 extending therein from a stud 150 which is sustained in a bore in the vertical portion 145 of the chuck arm. The nut 149 is traversed by a screw 151 having a knob 152 at its lower end. The groove at the lower end of the chuck block 147 is spanned by a plate 153 which is fastened thereto with the bolts 154. Screw 151 has a shoulder 155 at the inner face of the plate 153, while the knob 152 is held in place upon the screw shaft by a set screw 156 and additionally by a nut 157. The outer portion of the knob has radially extending bores 158 therein for receiving a spoke pin through which the handle may be rotated to raise and lower the chuck block 147 upon arm 133.

The exposed face of the chuck block 147 is slotted laterally or horizontally as at 159 to receive a chuck extension arm 160. This arm, in turn, is slotted intermediate its sidewise edges, as at 161, to provide for the passage therethrough of bolts 162 which are threaded into the chuck block whereby the extension arm 160 is adjustable longitudinally to provide support for the outer chuck member in accordance with the length of the ware being decorated.

The upper end of the chuck block 147 is bored transversely (Figure 2) to rotatably sustain a shaft 163, which at its forward face carries a cone, plate, chuck disc or the like 164 for engaging one end of the ware, depending upon its shape. Conical rollers 164a, rotatably mounted on a bracket 164b straddling the chuck extension 160, may be employed to assist the operator in inserting the ware into the chuck rapidly, and to supplement the wareholder 164 in supporting the work.

Shaft 163 may carry a pulley 165 pinned thereto as at 166 for providing a string drive which sometimes is desirable for rotating the ware independently of the stencil, but in accordance with the movement of the stencil. The string 167 is wound around the pulley several times so as to have frictional purchase upon its periphery and the ends of the string respectively are connected to the string holders 168 which are held by blocks 169 mounted adjustably through bolts 170 at the ends of the stencil support plate 78. The string drive is optional and usually is not used except where the work is heavy and is not driven sufficiently through frictional engagement with the screen.

At the forward portion of the chuck extension arm 160 a lever 171 is mounted pivotally intermediate its ends. The lever is bifurcated at the pivot to extend around the arm 160 (Figure 1) and a pivot pin 172 extends through the bifurcation and the arm whereby the lever is held against substantial lateral movement. The upward end of lever 171 carries chuck piece 5 rotatably mounted thereon and facing the chuck plate 164 in alignment therewith so that ware, such as the bottle shown in Figure 2, is held firmly between the two chuck elements. The lower end of lever 171 is in pivotal interconnection with chuck closing linkage driven from the cam 9.

Drive for the chuck, chuck arm and squeegee

Figure 7:
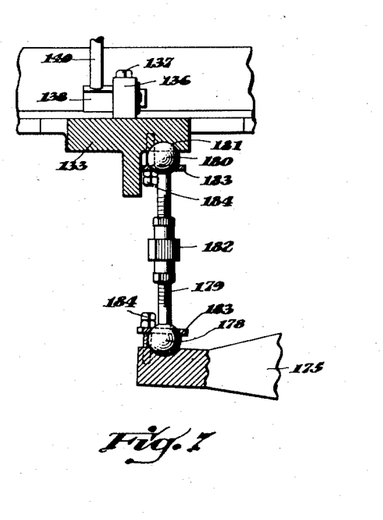
Figure 7 is a cross sectional view taken on the line 7—7 of Figure 5 showing details of construction of a ball and socket linkage between the cam arm and the chuck assembly.

Cams 9 and 10 are mounted on stub shaft 42 at the forward face of the speed box 38 and a bearing block 173 is positioned upon plate 37 adjacent these cam elements. The block is bored transversely at its upper end to rotatably support a shaft 174 which sustains a rocker arm 175 at the inner face of the block, the outer end of shaft 174 carrying a nut 176. One end of the rocker arm 175 has a roller 177 rotatably supported thereon for engagement with the periphery of cam 9. The opposite end of rocker arm 175 has a socket formed therein as shown in Figure 7. The socket receives a ball 178 at one end of a connecting link 179 which has another ball 180 at its opposite end fitting within a socket 181 that is formed in the lower face of the chuck arm 133. The link 179 also is provided with a turn buckle 182 intermediate its ends for adjustment of the link to move the squeegee and chuck relatively toward and from the screen. Balls 178 and 180 are held in their sockets by plates 183 which have bores therein engaging the outer surfaces of the balls and which are held in place by means of pairs of screws 184, one pair for each plate.

Cam 9 has two throws arranged opposite one another. Each of these throws lowers the one end of the rocker arm 175 carrying roller 177, thereby raising the opposite end to lift the link 179 and drive the chuck arm 133 upwardly toward the screen. This same movement operates the link 140, raising the back part of the squeegee frame and lowering the squeegee 8 at the opposite side of the pivot, to bring the squeegee into engagement with the screen in unison with the chuck.

Cam 10 is a facial cam with two lobes cut on an annular flange 185 extending outwardly. The back plate of this cam is slotted as at 186 and bolts 187 pass through the slots into engagement with the face of the cam 9, the slots providing radial adjustment of the lobe positions of cam 10 independently of cam 9.

Cam 10 is engaged by a roller 188 which is rotatably supported upon a lever 189 that has its opposite end fastened rigidly to a shaft 190 that passes through the block 173 on an axis transverse to the axis of the shaft 174. The opposite end of the shaft 190 has a lever 191 pinned thereto and extending upwardly. This lever controls chuck opening and closing and prevents the operation of the squeegee if the chuck is not loaded. To accomplish these purposes there are two linkage systems, one extending directly to the chuck opening and closing lever 171, and the other operated in unison with the first, to a control finger indicated generally at 12 (Figure 14). The linkage system to the chuck lever 171 comprises a link member 192 extending from the upper extremity of the lever 191 to one end of a rocker arm 193 which is pivoted intermediate its ends upon a stud 194 (Figure 2). The stud is carried in a bracket 195 which is fastened upon the bracket 94. The opposite end of the rocker 193 is interconnected with one end of the chuck lever 171 through a link 196. Thus, pivotal movement of the cam follower 188 shifts the link 192, rocks the arm 193 to drive the link 196 whereby the outer chuck lever 171 is moved back and forth in accordance with the cam to open and to close the chuck.

Squeegee control finger 12, in accordance with the embodiment of the invention disclosed in the drawings is also in the form of a rocker 197 pivotally mounted upon a pin 198 which is sustained in a bearing block 199 supported upon the lower face of guide plate 73. The upward portion of this arm has a metal insert 200 (Figure 9), hardened against wear, while the lower end of the arm extends transversely in offset relationship to the upper part to accommodate facial mounting thereon of a control link 201. The opposite end of the control link is pivotally connected to the rocker arm 193 at a point intermediate the pivot point of the rocker arm and the connection thereto of the link 196.

The various links which have been referred to, 157, 162 and 165, all are adjustable, each typically comprising connection blocks at its ends through which the link pivots pass; the links are rods threaded and locked to the blocks.

The linkage system just described provides oscillation of the control finger 200 in accordance with chuck operation. The upper end of the finger insert 200 is arranged for cooperation with a ledge provided by a plate 202 which extends below a strap 203 spanning the front and back cross pieces 54 and 55 of outer frame 52 of the squeegee assembly. The strap 203 (Figure 9) is fastened by means of a bolt 204 to the rear piece 54 of the outer squeegee frame while the forward end of the strap rests upon the cross member 55 of the squeegee frame but is not connected to it. At this point the strap is guided against lateral displacement by means of a bolt 205 which is threaded through the cross piece 55 and extends upwardly above the cross piece where it is counter-turned for guiding reception within a bore at the forward end of the strap 203. Inner frame 58 of the squeegee assembly has an adjustment screw 207 extending downwardly from its forward portion, the screw having a thumb nut 208 at its upper end and a lock thumb nut 209 bearing against the cross piece of the inner frame. This screw terminates above the strap 203, the engagement being adjustable through the screw and lock nut.

The ledge provided by plate 202 is adjacent the control finger element 197 and is engaged by the insert 200 thereof when no ware is in the chuck, but passes the insert when the chuck is loaded. Thus, the lever 171 moves from its outermost position to engage the end of the ware when ware is placed within the chuck, and, if no ware is present, then the lever moves still farther inwardly, that is, toward the chuck plate 164. The parts, including the position of the control finger are so adjusted that when the chuck arm 171 is not blocked against inward movement by the interposition of ware, then link 196 swings the upper part of the rocker arm 193 forwardly, simultaneously moving the control link 201 forwardly and thus swinging the control finger backwardly until it is in a position underneath the ledge 202.

Lever 191, operated by the chuck cam 10, is biased toward the face of the chuck by means of a tension spring 210 which is hitched to an eye 211 at the front face of the bracket 94. Thus, this spring always tends to urge the entire linkage system in a direction in which the control finger 197 will be under the ledge 202.

When the control finger is underneath the ledge 202, that is, when the chuck is not loaded, the chuck arm 133 is driven as previously described, and link 140 is operated to lower the squeegee toward the screen. However, now, only the outer frame 52 of the squeegee assembly is permitted to swing pivotally because the ledge engages the control finger; the strap 203 is lifted only until its upper surface is engaged by the lower end of the screw 207. Therefore, the squeegee arm 62 which is carried by the inner frame, now stopped from downward movement, is prevented from lowering the squeegee into engagement with the screen.

Conversely, when the chuck is loaded the control finger 197 is held in a position out of line with the ledge and the squeegee arm and inner squeegee frame 58 follow the pivotal movement of the outer squeegee frame to bring the squeegee into engagement with the screen.

No binding action between the parts occurs when the control finger blocks the squeegees against movement because, when the chuck lever 171 moves to its innermost position, the cam follower 168 simply does not reach the surface of the cam but is spaced away from it.

Adjustability of the length of stroke and of the field of movement relative to the squeegee of a stroke of a given length are highly desirable in machines of this type because screens of minimum size may be employed. Moreover, it is to be observed that the squeegee 8 and chuck elements 5 and 6 move automatically toward the screen at the start of screen operation in one direction of movement, move away from the screen at the end of that stroke, then repeat this cycle as the screen is moving through its return stroke, whereby that ware is decorated during movement of the screen in both directions. This is an important feature because warpage or distortion of the screen design is avoided inasmuch as such warpage as would occur, were the screen to be moved past the stencil always in one direction, is compensated by warpage in an opposite direction when the screen returns.

It also is to be observed that the stroke adjustment, adjustment of the chuck linkage and adjustment of the reach rod 179 permit the so-called "color stop" to be controlled, that is, the point upon the screen just before and just beyond the area in which its indicia is confined at which the squeegee engages and departs from the screen surface. By virtue of these features the machines of the present invention are particularly well suited to multicolor decoration of articles where accurate registry of colors is required.

The chuck arm 133 swings downwardly away from the stencil and cam 10 coincidentally swings the upper end of chuck lever 171 to an outward position to open the chuck. When the chuck arm is all the way down the chuck is all the way open to provide free access to the chuck for loading. The throws upon the cams 9 and 10 are arranged relative to one another such that the chuck moves to a closed position for engagement with the ware promptly as the arm 133 moves the chuck toward the screen and vice versa. This minimizes the loading and unloading time required.

Figures 4, 9, 16, 17:
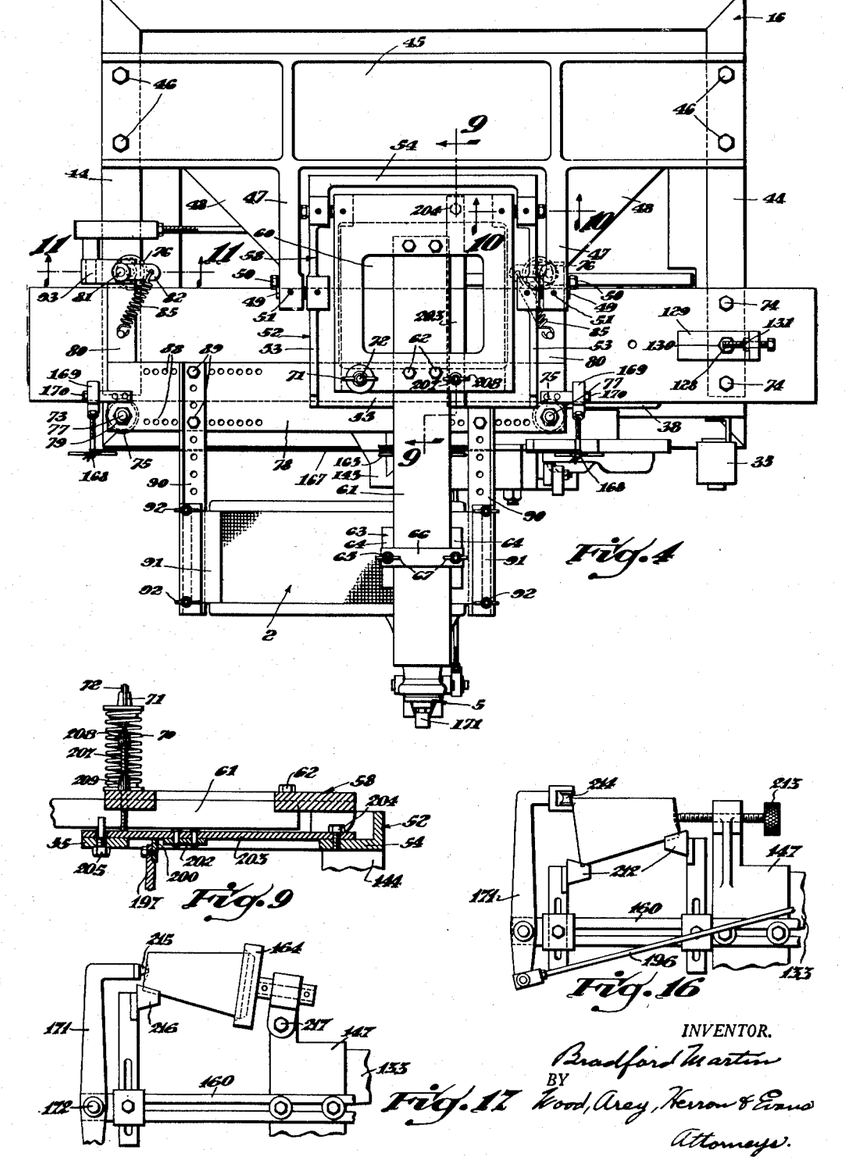
Figure 4 is a top plan view.
Figure 9 is a sectional view through the squeegee support assembly showing the details of construction of the automatic squeegee cutout.
Figures 16 and 17 are views showing modified arrangements for supporting ware and for controlling the squeegee in accordance with the disposition of ware in the support.

Lever 171 in the chuck form heretofore described acts conjointly as a wareholding lever and as a part of the mechanism associated with the control finger 197. In Figures 16 and 17 modified forms of chucks are disclosed, according to which the ware is supported primarily on its periphery, and lever 171 operates primarily as a finger, determining whether ware is placed in the chuck to control the squeegee accordingly.

In Figure 16 ware of a conical or tubular shape, such as tumblers, straight side glasses and jars or the like, is rotatably journalled upon the rollers 212 which are arranged in pairs appropriately spaced apart similarly to the rollers 164a previously described. The upper end of the chuck block 147 carries a screw 213 which engages the bottom of the ware to hold it in alignment longitudinally, while the lever 171 has a roller 214 which contacts the mouth of the workpiece while permitting it to rotate on its axis for decoration. If there is no piece of work in place in the wareholder then the roller 214 is unengaged and the upper end of the lever 171 swings inwardly, as before, to throw the control finger 197 under the ledge 202 and limit downward movement of the squeegee.

The wareholder shown in Figure 17 is of similar operation except in this case the bottom of the workpiece is engaged by a finger 215 which is located at the upper end of the arm 171 for contacting the workpiece at the center of its bottom. One pair of rollers 216 supports the workpiece peripherally while the mouth is received in cup member 164. When the ware is conical the axis of this piece must be on an incline; therefore the journal block in this structure is swivelled on a bolt 217 at the upper end of the chuck block 147.

The machine operates continuously and when not furnished with an automatic loader the operator stands in front of it, placing workpieces into the chuck and removing them from the chuck as the chuck is lowered into accessible position and as the lever 171 swings in and out. The unskilled operator sets the speed at a suitable pace, through adjustment of the control wheel 30, and conveniently increases speed of production as the operator becomes more adept in handling the work.

Having described my invention, I claim:

1. A decorating machine comprising a stencil, a squeegee at one side of the stencil and a chuck having at least one jaw movable to open and closed positions at the other side of the stencil, means for moving the chuck and squeegee in unison toward the stencil, including a connection for simultaneously operating the movable jaw of said chuck, and a mechanical linkage controlled by said interconnection for withholding the squeegee from the screen if the chuck is not loaded with ware as it is being moved toward the screen.

2. A stencilling machine comprising a stencil, a squeegee at one side thereof, a wareholder at the other side thereof, means including a motor and a first cam driven thereby for moving the stencil relative to the squeegee and wareholder, and means including a second cam driven in unison with the first cam for moving the squeegee and wareholder toward and from the stencil upon movement of the stencil in one direction and also for moving the squeegee and wareholder toward and from the stencil upon movement of the stencil in return direction.

3. A stencil decorating machine comprising a stencil, a squeegee and a chuck which respectively are located at opposite sides of said stencil, means for moving said squeegee and chuck in unison toward and from said stencil, said chuck comprising spaced elements for holding ware therebetween, at least one of which elements is movable to open and closed position, means for operating the movable one of said chuck elements to open and closed positions, and a mechanical linkage interconnected with the movable one of the chuck elements, said linkage including a stop member movable into a position for withholding said squeegee from engagement with said stencil unless a piece of ware is interposed between said chuck elements.

4. A decorating machine comprising a stencil movable in back and forth directions, a squeegee located at one side of said stencil, a wareholder located at the opposite side of said stencil and comprising spaced elements for supporting a piece of ware therebetween, one of said elements being movable to open position for introducing and releasing ware from said wareholder, first means for moving said wareholder and squeegee toward and from said stencil in unison, second means operated in unison with said first means for operating the said one of said wareholder elements in timed relationship to the operation of said first means and a control device associated with said second means for rendering said first means ineffective, thereby to prevent engagement of said squeegee with said stencil unless a piece of ware is interposed between said wareholding elements.

5. In a stencil decorating machine having a chuck comprising ware holding elements for supporting a piece of ware, a squeegee relatively movable toward said chuck, means for moving said squeegee toward said chuck, means for opening and closing said wareholding elements, a control finger cooperable with the squeegee and a mechanical linkage movable in unison with at least one of said wareholding elements upon movement thereof toward closed position, for actuating said control finger to thereby disrupt movement of said squeegee relatively toward said chuck when one of said ware holding elements proceeds toward the other beyond a position thereof which corresponds to its normal closed wareholding position.

6. Decorating apparatus comprising a chuck, a squeegee, a stencil, means for effecting relative movement of the squeegee and the stencil toward and from one another, a pivotally mounted finger for preventing their engagement, means for effecting relative wiping movement of the squeegee upon the stencil for forcing printing media therethrough onto ware held in the chuck, and automatic means operable upon insertion of a piece of ware into the chuck for rendering said finger ineffective, said automatic means including a lever having a portion positioned for engagement with a surface of ware held in the chuck and a mechanical interconnection between said lever and said finger.

7. A stencil decorating machine comprising a frame, a stencil slidably supported by said frame, a squeegee assembly including a member pivotally mounted on said frame and a squeegee liftably mounted on said member and disposed at one side of said stencil, a chuck pivotally mounted on said frame and including a pair of cooperating elements, at least one of which is movable toward and from the other for holding ware therebetween and for presenting said ware to said screen, means for moving the said squeegee assembly and the said chuck toward and from said stencil in unison, means synchronized with such movement for moving the movable member of said chuck to open and to closed positions, a finger for preventing movement of said squeegee toward said screen independently of the movement of said member of said squeegee assembly, and a linkage extending from said finger to the movable member of said chuck for moving said finger into an out of the way position upon insertion of ware in said chuck.

BRADFORD MARTIN.

REFERENCES CITED

The following references are of record in the file of this patent:

UNITED STATES PATENTS

| Number | Name | Date |
| --- | --- | --- |
| 2,105,572 | Williams | Jan. 18, 1938 |
| 2,116,466 | Secoy | May 3, 1938 |
| 2,142,158 | Sloan | Jan. 3, 1939 |
| 2,174,298 | Whisner | Sept. 29, 1939 |
| 2,207,351 | McLaughlin | July 9, 1940 |
| 2,231,535 | Jackson | Feb. 11, 1941 |
| 2,237,058 | Nutt | Apr. 1, 1941 |
| 2,261,255 | Jackson | Nov. 4, 1941 |
| 2,301,119 | Holbrook | Nov. 3, 1942 |